United States Patent
Nagase

(10) Patent No.: US 7,577,505 B2
(45) Date of Patent: Aug. 18, 2009

(54) ELECTRIC POWER STEERING APPARATUS

(75) Inventor: Shigeki Nagase, Nabari (JP)

(73) Assignee: JTEKT Corporation, Osaka-shi (JP)

( * ) Notice: Subject to any disclaimer, the term of this patent is extended or adjusted under 35 U.S.C. 154(b) by 56 days.

(21) Appl. No.: 11/739,366

(22) Filed: Apr. 24, 2007

(65) Prior Publication Data

US 2007/0250233 A1    Oct. 25, 2007

(30) Foreign Application Priority Data

Apr. 24, 2006   (JP) ............................. 2006-119127

(51) Int. Cl.
*B62D 6/00*  (2006.01)
(52) U.S. Cl. ............................. 701/41; 701/22; 180/443
(58) Field of Classification Search .................. 701/22, 701/41, 42; 180/443; 318/799, 400.08; 388/815
See application file for complete search history.

(56) References Cited

U.S. PATENT DOCUMENTS 7,102,305 B2 * 9/2006 Suzuki .................. 318/400.02

2005/0257986 A1   11/2005 Kagei

FOREIGN PATENT DOCUMENTS

| EP | 1 470 988 A1 | 10/2004 |
| JP | 2002-19635 | 1/2002 |
| JP | 2002-362392 | 12/2002 |
| JP | 2003-284375 | 10/2003 |

\* cited by examiner

*Primary Examiner*—Gertrude Arthur Jeanglaud
(74) *Attorney, Agent, or Firm*—Oblon, Spivak, McClelland, Maier & Neustadt, P.C.

(57) ABSTRACT

A first restrict value calculating unit obtains a first restrict value Im1 on the basis of the integration value $(Id^2+Iq^2)$ of a d-axis current detection value and a q-axis current detection value. A second restrict value calculator 50 calculates a second restrict value Im2 on the basis of the maximum value of the integration values of the squares $Iu^2$, $Iv^2$, and $Iw^2$ of 3-phase current detection values. A target current value It calculated by a target current calculating unit 21 is restricted by so that a current value limiter so as to be not greater than the first restrict value Im1 and the second restrict value Im2. By using the two restrict value restricting the motor driving current, it is possible to control properly the motor driving current in accordance with a general driving condition and various steering conditions.

3 Claims, 4 Drawing Sheets

ELECTRIC POWER STEERING APPARATUS

This application is based on an claims a priority from a Japanese Patent Application No. 2006-119127 filed on Apr. 24, 2006, the entire content of which are incorporated by reference.

BACKGROUND OF THE INVENTION

The present invention relates to an electric power steering apparatus using a brushless motor to provide assistant steering force to a steering mechanism in an automotive vehicle.

Conventionally, there has been used an electric power steering apparatus which drives an electric motor in accordance with steering torque provided by a driver to a handle (steering wheel) so as to provide assistant steering force to a steering mechanism in an automotive vehicle. As the electric motor of the electric power steering apparatus, a brush motor has been used widely. Recently, a brushless motor has been used in view of enhancing reliability and durability or reducing inertia.

In addition, in an electric power steering apparatus mounted on a full-sized vehicle or a medium-sized vehicle, a driving current of the electric motor generating the assistant steering force may increase excessively and thus causing a problem of generating heat resulting from the motor driving current. In order to protect electronic components included in the electric power steering apparatus, it is required to suppress the amount of heat resulting from the motor driving current so as to be not greater than a predetermined value.

Accordingly, in the field of the electric power steering apparatus, there has been known about a method of estimating the amount of heat from an actual current value flowing in the electric motor so as to restrict the motor driving current on the basis of the estimated amount of heat. For example, in JP2003-284375A, there is disclosed a method of estimating a coil temperature on the basis of the square sum of the values of two-phase current acquired by converting the level of three-phase current flowing in the electric motor into two-phase current. In JP2002-19635A, there is disclosed a method of integrating the squared values of the motor driving current. In JP2002-362392A, there is disclosed a method of calculating a maximum current value on the basis of the coefficients of the motor driving current and detected heat.

However, in the electric power steering apparatus having a brushless motor, there is performed a control in which the level of the three-phase current is changed to form a sinusoidal wave form with delaying the phases of the three phase current are delayed by $2\pi/3$ one another in accordance with the rotation position (angle) of a rotor of the brushless motor. Accordingly, an excessively large amount of current may concentrate in a specific phase depending on the rotation position of the rotor and thereby increasing the amount of heat in that phase.

For example, as shown in FIG. 6, in the case of changing the three-phase current flowing in the brushless motor in accordance with the rotation position $\theta$ of the rotor, the rotor stopped at a position corresponding to $\theta=5\pi/6$ (or the rotor slowly rotated with very slow speed in an almost halt state). In this case, an absolute value of a w-phase current Iw approximately corresponds to the maximum current value Imax. Accordingly, the amount of heat in the w-phase becomes greater than that for the case where the w-phase current is alternating like the sinusoidal wave.

In such an electric power steering apparatus having the brushless motor, as the rotation speed of the rotor decreases, irregularity or variation of the amount of heat occurs among the three phases. Accordingly, even when the motor driving current is restricted on the basis of the amount of heat estimated from the current flowing in the brushless motor without discriminating respective phases, an excessively large amount of current may concentrate in a specific phase and thereby increasing the amount of heat in that phase. Accordingly, it is difficult to properly protect electronic components included in that phase.

SUMMARY OF THE INVENTION

Accordingly, an object of the present invention is to provide an electric power steering apparatus including a brushless motor capable of properly restricting a motor driving current.

According to a first aspect of the invention, n electric power steering apparatus capable of restricting a motor driving current, comprises:

a brushless motor that generates assistant steering force to be supplied to a steering mechanism of an automotive vehicle;

a controller that acquires a level of three-phase voltage used for driving the brushless motor;

a motor driver that drives the brushless motor based on the three-phase voltage of the level acquired by the controller; and a current detector that detects a level of three-phase current flowing in the brushless motor, wherein the controller includes:

a current value converter that converts the level of the three-phase current into a d-axis current detection value and a q-axis current detection value, a target current calculator that calculates a target value of a current flowing in the brushless motor on the basis of an input value including at least a steering torque, a current value restrictor that restricts the target value calculated by the target current calculator so as not to be greater not only than a first restrict value based on a square sum of the d-axis current detection value and the q-axis current detection value but also than a second restrict value based on the squares of the level of the three-phase current, and a voltage value determining unit that determines a level of three-phase voltages on the basis of target value restricted by the current value restrictor, the d-axis current detection value, and the q-axis current detection value.

The electric power steering apparatus according to a second aspect of the invention, the first restrict value is determined on the basis of an integration value of the square sum of the d-axis current detection value and the q-axis current detection value.

The electric power steering apparatus according to a third aspect of the invention, the second restrict value is determined on the basis of a maximum value of an integration value of the squares of the level of a u-phase current detected by the current detector, an integration value of the squares of the level of a v-phase current detected by the current detector, and an integration value of the squares of the level of a w-phase current detected by the current detector.

According to the first aspect of the invention, in an electric power steering apparatus having a brushless motor, by using a first restrict value on the basis of the square sum of a d-axis current and a q-axis current, in consideration of the total amount of heat, a motor driving current is limited In the electric power steering apparatus having a brushless motor, by using a second restrict value on the basis of the square sum of the three-phase current, a motor driving current is restricted in consideration of the amount of heat of the each phase. By using the two restrict value so as to restrict the motor driving current, it is possible to control properly the motor driving current in accordance with a general driving condition and various steering conditions such as maintaining steering, a fast steering. Accordingly, it is possible to protect a device from emitting the heat in the various steering conditions.

According to the second aspect of the invention, the motor driving current can be restricted so that a total amount of heat is not greater than a predetermined value by restricting the motor driving current not greater than the first restrict value which is on the basis of the integration value of the square sum of the d-axis current and the q-axis current.

According to the third aspect of the invention, the motor driving current can be restricted so that an amount of heat of the each phase is not greater than a predetermined value by restricting the motor driving current not greater than the second restrict value which is on the basis of a maximum value of the integration value of the squares of the three-phase current.

DETAILED DESCRIPTION OF PREFERRED EMBODIMENTS

Figure 1:
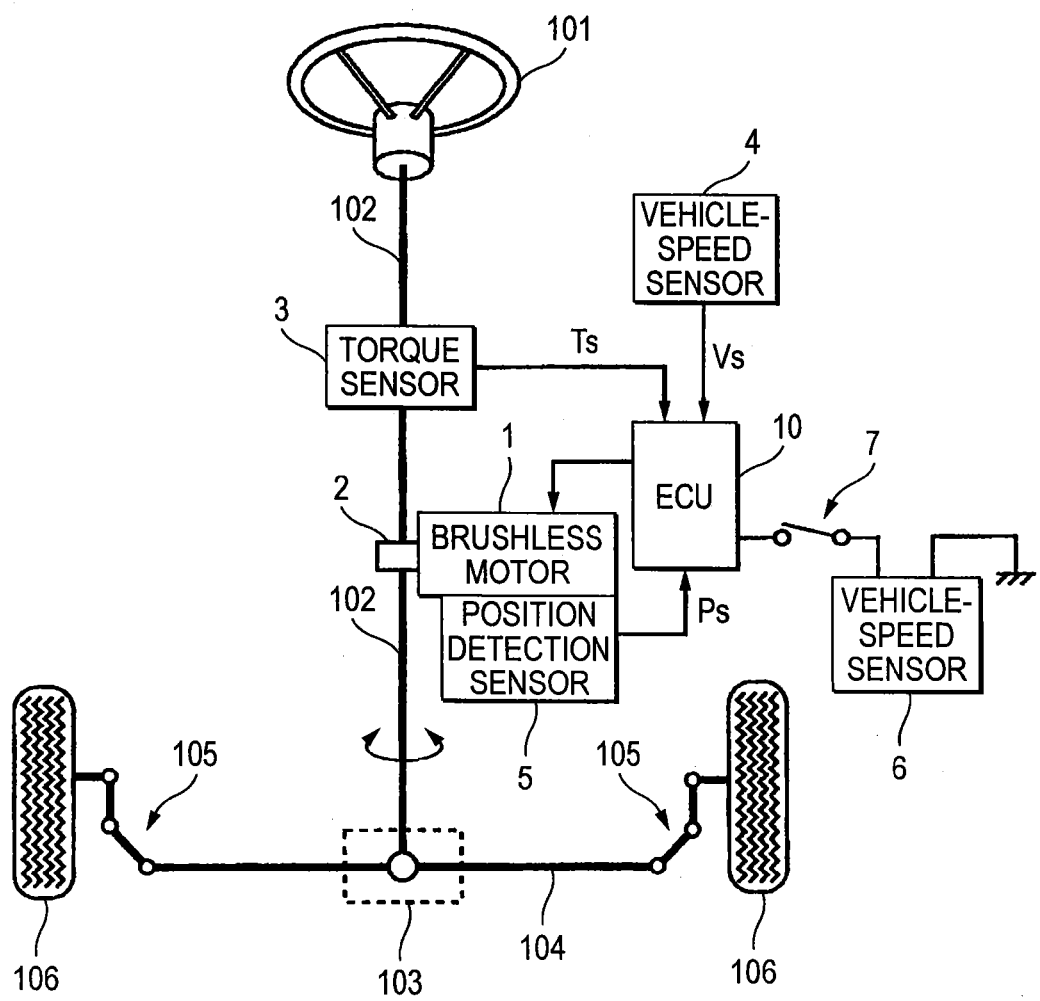
FIG. 1 is a schematic diagram illustrating a configuration of an electric power steering apparatus and a related configuration of an automotive vehicle according to an embodiment of the invention.

FIG. 1 is a schematic diagram illustrating a configuration of an electric power steering apparatus and a related configuration of an automotive vehicle according to an embodiment of the present invention. The electric power steering apparatus shown in FIG. 1 is a column assist type electric power steering apparatus that includes a brushless motor 1, a decelerator 2, a torque sensor 3, a vehicle-speed sensor 4, a position detecting sensor 5, and a current controller (Electronic Control Unit: hereinafter, refer to as ECU) 10.

As shown in FIG. 1, one end of a steering shaft 102 is attached to a handle (steering wheel) 101, and the other end of the steering shaft 102 is connected to a rack shaft 104 through a rack pinion mechanism 103. Each of ends of the rack axis 104 is connected to a wheel 106 through a connection member 105 configured by a tie rod and a knuckle arm. When a driver rotates the handle 101, the steering shaft 102 rotates and the rack axis 104 starts its reciprocating movement. By the above-mentioned reciprocating movement of the rack axis 104, the wheel 106 changes its moving direction.

The electric power steering apparatus provides the assistant steering force in order to reduce a load of the driver. The torque sensor 3 detects a steering torque applied to the shaft 102 by the operation of the handle 101 and outputs a steering torque signal Ts indicative of the steering torque. The vehicle-speed sensor 4 detects the speed of the automotive vehicle (vehicle speed) and outputs a vehicle-speed signal Vs indicative of the vehicle-speed. The position detection sensor 5 outputs a position signal Ps indicative of a rotor rotation position (angle) of the brushless motor 1. The position detecting sensor 5 can be configured, for example, of a resolver.

The ECU 10 receives electric power from a vehicle-battery 6 via an ignition switch 7, and drives the brushless motor 1 on the basis of the steering torque signal Ts, the vehicle-speed signal Vs, and the position signal Ps. When driven by the ECU 10, the brushless motor 1 generates assistant steering force. The decelerator 2 is disposed between the brushless motor 1 and the steering shaft 102. The assistant steering force generated by the brushless motor 1 causes the decelerator 2 to rotate the steering shaft 102.

As a result, the steering shaft 102 rotates on the basis of both the steering torque applied to the handle 101 and the assistant steering force generated by the brushless motor 1. The electric power steering apparatus performs the assistant steering by applying the assistant steering force generated by the brushless motor 1 to the steering mechanism in the vehicle.

Figure 2:
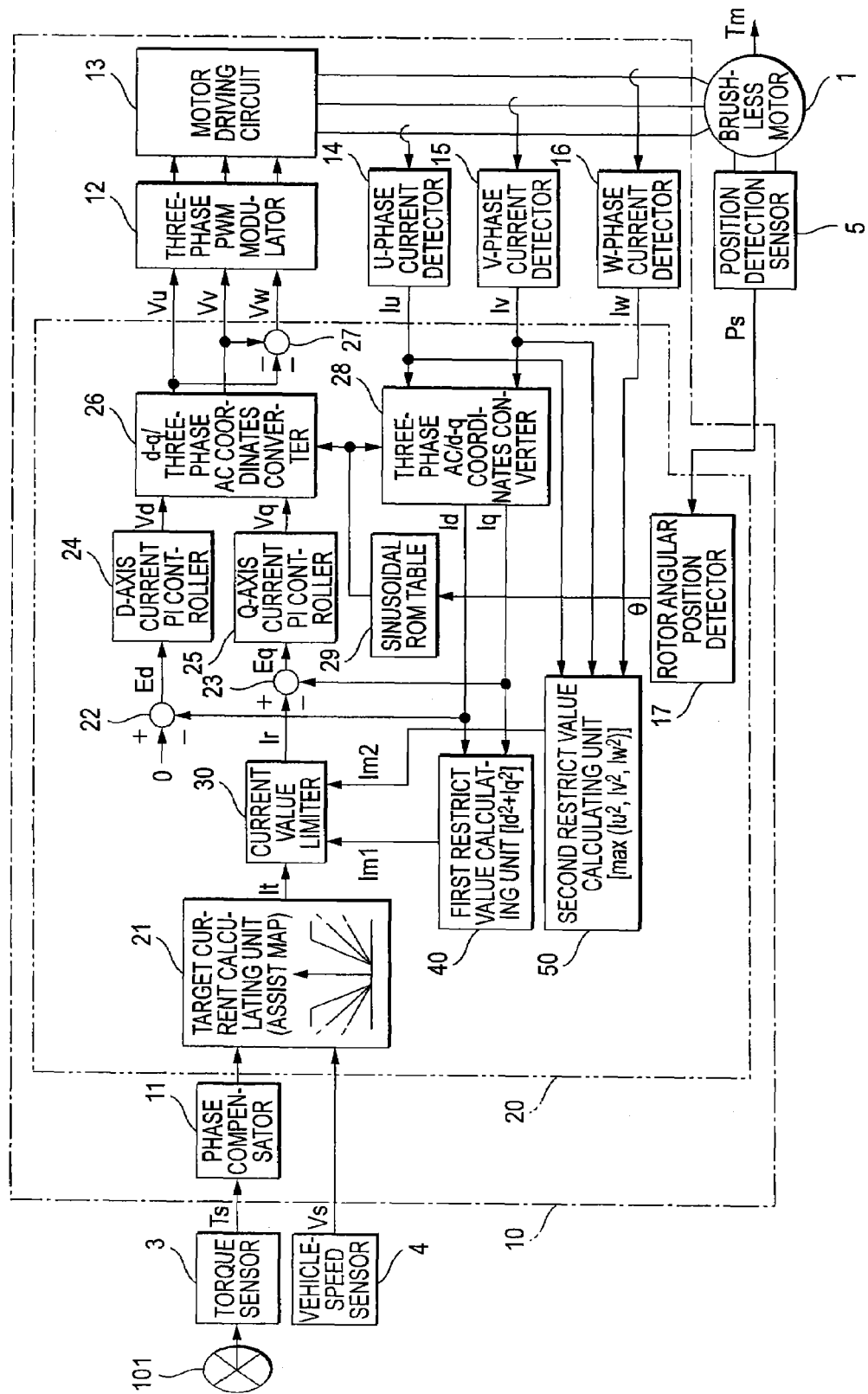
FIG. 2 is a block diagram illustrating a detail configuration of ECU included in the electric power steering apparatus.

FIG. 2 is a block diagram illustrating a detailed configuration of the ECU 10. The ECU 10 includes a phase compensator 11, a micro computer (hereinafter, refer to as a computer) 20, a three-phase PWM (Pulse Width Modulation) modulator 12, a motor driving circuit 13, a u-phase current detector 14, a v-phase current detector 15, and a w-phase current detector 16.

The steering torque signal Ts output from the torque sensor 3, the vehicle-speed signal Vs output from the vehicle-speed sensor 4, the position signal Ps output from the position detecting sensor 5 are inputted to the ECU 10. In the phase compensator 11, a phase compensation is performed onto the steering torque signal Ts, and the steering torque signal after the phase compensation is output to the computer 20.

The computer 20 functions as controller for acquiring the level of three-phase voltage used for driving the brushless motor 1. More specifically, the computer 20 executes a program stored in a memory (not shown) installed in the ECU 10, and functions as a target current calculating unit 21, subtraction units 22 and 23, a d-axis current PI controller 24, a q-axis current PI controller 25, a d-q/ three-phase AC coordinates converter 26, a sign inverting adder 27, a three-phase AC/d-q coordinates converter 28, a sinusoidal waveform ROM table 29, a rotor angular position detecting unit 17, a current value limiter 30, a first restrict value calculating unit 40, and a second restrict value calculating unit 50. The function of the computer 20 will be described later.

The three-phase PWM modulator 12 and the motor driving circuit 13 are configured as a hardware (circuit), and function as motor driver for driving the brushless motor 1 using the three-phase voltage of the level acquired by the computer 20. More specifically, the three-phase PWM modulator 12 generates three PWM signals having duty ratios corresponding to the three voltages target values (described later) acquired by the computer 20. The motor driving circuit 13, for example, is a PWM voltage-type inverter configured by using switching elements such as power MOS transistors. The motor driving circuit 13 turns ON or OFF the switching elements in accordance with the three PWM signals so as to generate the three-phase voltage to be supplied to the brushless motor 1.

The brushless motor 1 includes three coils (not shown) corresponding to the u-phase, v-phase, and w-phase. The three-phase voltage generated by the motor driving circuit 13 is supplied to the respective three coils. As mentioned later, the computer 20 performs a control in which the level of the three-phase current is changed to form a sinusoidal wave form with delaying the phases of the three phase current are delayed by 2π/3 one another in accordance with the rotation position (angle) of a rotor of the brushless motor. Accordingly, a current having a sinusoidal waveform flows in the coils of the each phase of the brushless motor 1 in accordance with the voltage for the each phase and thus rotating the rotor of the brushless motor 1. Accordingly, a torque Tm corresponding to the amount of current flowing in the brushless motor 1 is generated from the rotation shaft of the brushless motor 1. The torque Tm is used as the assistant steering.

The u-phase current detector 14, the v-phase current detector 15, and the w-phase current detector 16 function as current detector for detecting the level of the three-phase current flowing in the brushless motor 1. More specifically, the u-phase current detector 14 detects the level of the u-phase current flowing in the brushless motor 1, the v-phase current detector 15 detects the level of the v-phase current flowing in the brushless motor 1, and the w-phase current detector 16 detects the level of the w-phase current flowing in the brushless motor 1, respectively. Hereinafter, the level of the current detected by each of the u, v, and w-phase current detectors will be referred to as a u-phase current detection value $1u$, a v-phase current detection value $1v$, and w-phase current detection value $1w$, respectively.

Figure 3:
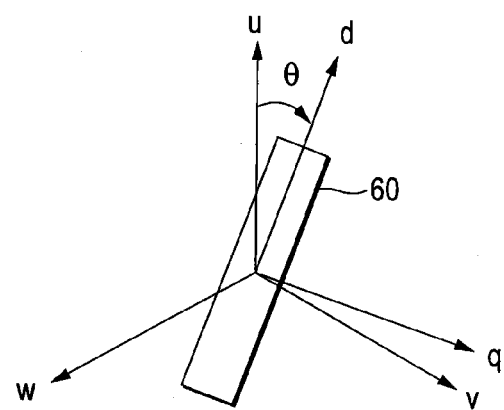
FIG. 3 is a schematic diagram illustrating a three-phase AC coordinates and a d-q coordinates in a three-phase brushless motor.

Hereinafter, the detailed functions of the computer 20 will be described in detail. The rotor angular position detector 17 acquires a rotor rotation position (angle θ) of the brushless motor 1 on the basis of the position signal Ps output by the position detection sensor 5. As shown in FIG. 3, when a u-axis, a v-axis, and a w-axis are established with respect to the brushless motor 1, and the d-axis and the q-axis are established to the rotor 60 of the brushless motor 1, an angle θ is set between the u-axis and the d-axis.

The sinusoidal waveform ROM table 29 is a table that stores sinusoidal values corresponding to an angle range between zero and π/2 (or, between zero and 2π). By using the sinusoidal waveform ROM table 29, sinusoidal and cosine values [sin θ, cos(θ−2π/3) and the like] included in the following calculation expression corresponding to the angle θ acquired by the rotor angular position detector 17 can be calculated.

The three-phase AC/d-q coordinates converter 28 functions as current value converter for converting the level of the three-phase current detected by the three current detectors into a current detection value on the d-q coordinates. More specifically, the three-phase AC/d-q coordinates converter 28 acquires a d-axis current detection value Id and a q-axis current detection value $1q$ by performing the following expressions (1) and (2) with using the u-phase current detection value $1u$ detected by the u-phase current detector 14 and the v-phase current detection value $1v$ detected by the v-phase current detector 15.

$$Id=\sqrt{2}\times\{Iv\times\sin\theta-Iu\times\sin(\theta-2\pi/3)\} \quad (1)$$

$$Iq=\sqrt{2}\times\{Iv\times\cos\theta-Iu\times\cos(\theta-2\pi/3)\} \quad (2)$$

In addition, the sinusoidal and cosine values included in the expressions (1) and (2) are acquired from the values output by the sinusoidal waveform ROM table 29.

The target current calculating unit 21 calculates a q-axis current value to be supplied to the brushless motor 1 (hereinafter, referred to as a target current value It) on the basis of the phase-compensated steering torque signal (the output signal of the phase compensation unit 11) and the vehicle-speed signal Vs. More specifically, the target current calculating unit 21 includes a table (hereinafter, referred to as an assist map) which stores the relationship between the steering torque and the target current value It in a corresponding manner as parameters of the vehicle-speed, and acquires the target current value It with reference to the assist map. By using the assist map, when a steering torque having a specific strength is applied, a q-axis current value for generating the assistant steering force that has a proper strength corresponding to the specific strength can be acquired. Accordingly, a q-phase current value to be supplied to the brushless motor 1 can be acquired.

In addition, the target current value It is a signed current value and the sign of the target current value It represents a direction of the assistant steering. For example, when the target current value It has a positive value, the assistant steering is performed so as to turn to a right direction. When the target current value It has a negative value, the assistant steering is performed so as to turn to a left direction.

The first restrict value calculating unit 40 calculates a restrict value of the q-axis current to be supplied to the brushless motor 1 (hereinafter, referred to as a first restrict value I$m$1) by using the following method. The second restrict value calculating unit 50 calculates another restrict value of the q-axis current to be supplied to the brushless motor 1 (hereinafter, referred to as a second restrict value I$m$2) by using a following method. The current value limiter 30 limits the target current value It so that the value It is not greater than the first restrict value I$m$1 and the second restrict value I$m$2. Hereinafter, the target current value limited by the current value limiter 30 so as not to be more than the two restrict values will be referred to as a restrict target current value Ir.

The subtraction units 22 and 23, the d-axis current PI controller 24, the q-axis current PI controller 25, the d-q/three-phase AC coordinates converter 26, and the sign inverting adder 27 function as a voltage value determining unit for determining the level of the three-phase voltage used for the driving of the brushless motor 1 on the basis of the restrict target current value Ir, the d-axis current detection value Id and the q-axis current detection value Iq.

The subtraction unit 22 calculates a deflection Ed (=−Id) between the zero value and the d-axis current detection value Id. The subtraction unit 23 calculates a deflection Eq(=Ir−Iq) between the restrict target current value Ir and q-axis current detection value Iq. The d-axis current PI controller 24 calculates a d-axis voltage instruction value Vd by performing a proportional integral control calculation shown in a following expression (3) for the deflection Ed. The q-axis current PI controller 25 calculates a q-axis voltage instruction value Vq by performing the proportional integral control calculation shown in a following expression (4) for the deflection Eq.

$$Vd=K\times\{Ed+(1/T)\int Ed\cdot dt\} \quad (3)$$

$$Vq=K\times\{Eq+(1/T)\int Eq\cdot dt\} \quad (4)$$

In the expressions (3) and (4), the K is a proportional gain constant and the T is an integral time.

The d-q/three-phase AC coordinates converter 26 and the sign inverting adder 27 convert the d-axis voltage instruction value Vd and the q-axis voltage instruction value Vq into a voltage instruction value of the three-phase AC coordinates. More specifically, the d-q/ three-phase AC coordinates converter 26 calculates a u-phase voltage instruction value Vu and a v-phase voltage instruction value Vv by performing the operation shown in following expressions (5) and (6) for the d-axis voltage instruction value Vd acquired by the d-axis current PI controller 24 and the q-axis voltage instruction value Vq acquired in the q-axis current PI controller 25. The sign inverting adder 27 acquires a w-phase voltage instruction value Vw by performing the operation shown in a following expression (7) for the u-phase voltage instruction value Vu and the v-phase voltage instruction value Vv acquired by the d-q/three-phase AC coordinates converter 26.

$$Vu=\sqrt{(2/3)} \times \{Vd \times \cos\theta - Vq \times \sin\theta\} \quad (5)$$

$$Vv=\sqrt{(2/3)} \times \{Vd \times \cos(\theta-2\pi/3) - Vq \times \sin(\theta-2\pi/3)\} \quad (6)$$

$$Vw=-Vu-Vv \quad (7)$$

The sinusoidal value and the cosine value included in the expressions (5) and (6) are values which are output from the sinusoidal waveform ROM table 29.

Accordingly, the subtraction units 22 and 23, the d-axis current PI controller 24, the q-axis current PI controller 25, the d-q/three-phase AC coordinates converter 26, and the sign inverting adder 27 perform a feed back control in order that the d-axis current detection value Id becomes "0" and the q-axis current detection value Iq corresponds to the restrict target current value Ir. Accordingly, the assistant steering force in accordance with the restrict target current value Ir is generated in the brushless motor 1.

Figure 4:
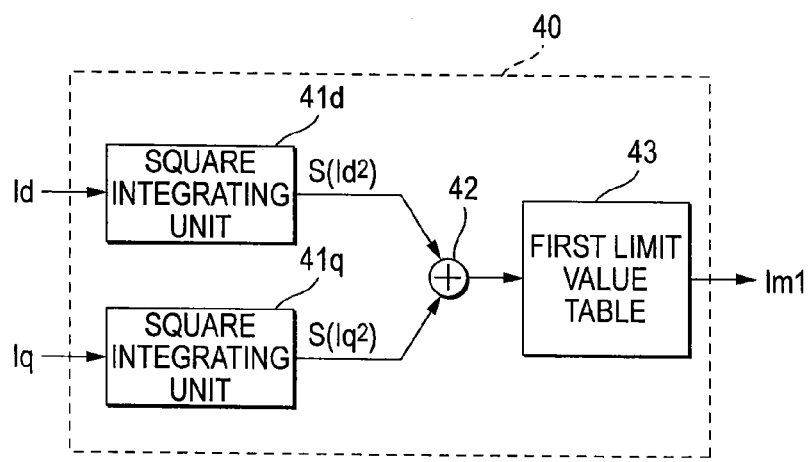
FIG. 4 is a block diagram illustrating a detail configuration of a first restrict value calculating unit included in ECU.

The first restrict value calculating unit 40 includes square integrating units 41d, 41q, an adder 42, and a first restrict value table 43 as shown in FIG. 4. The square integrating unit 41d integrates the squares of the d-axis current detection value Id for a predetermined time and the square integrating unit 41q integrates the squares of the q-axis current detection value Iq for a predetermined time. The adder 42 acquires the sum of two integration values acquired in the square integrating units 41d and 41q. The first restrict value table 43 stores the restrict value of the q-axis current to be supplied to the brushless motor 1 corresponding to the integration value of the square sum of the d-axis current and the q-axis current.

A total amount of heat in the brushless motor 1 and a peripheral circuit of the brushless motor 1 (for example, in the motor driving circuit 13 or the u-phase current detector 14, and the like) is estimated on the basis of the output of the adder 42 (that is, the integration value of ($Id^2+Iq^2$)). Accordingly, the restrict value of the q-axis current of the total estimated amount of heat is stored in the first restrict value table 43 corresponding to the integration value of ($Id^2+Iq^2$)). By using the output of the adder 42, with reference to the first restrict value table 43, a first restrict value Im1 is determined in the first restrict value calculating unit 40.

Figure 5:
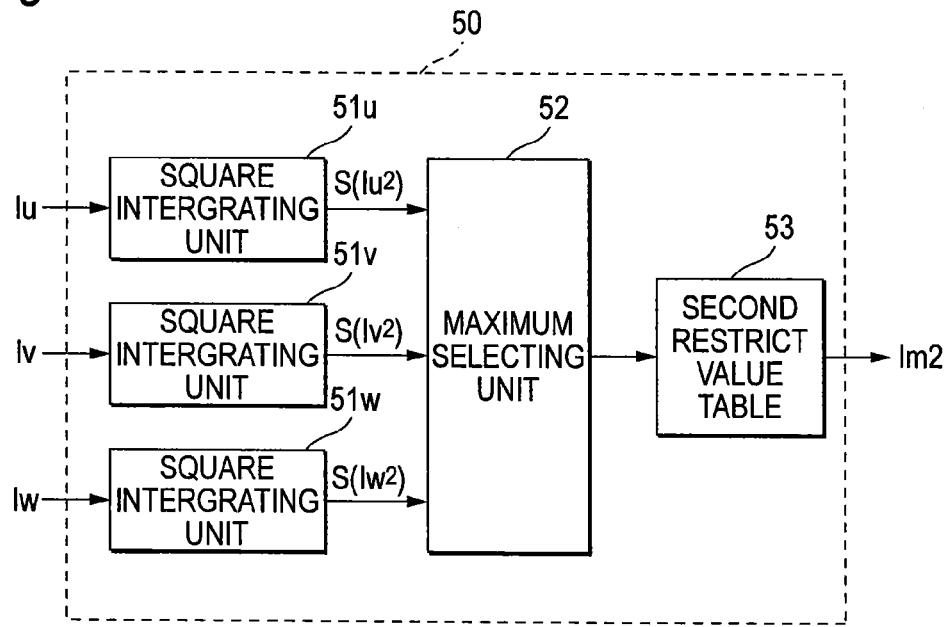
FIG. 5 is a block diagram illustrating a detail configuration of a second restrict value calculating unit included in ECU.
Figure 6:
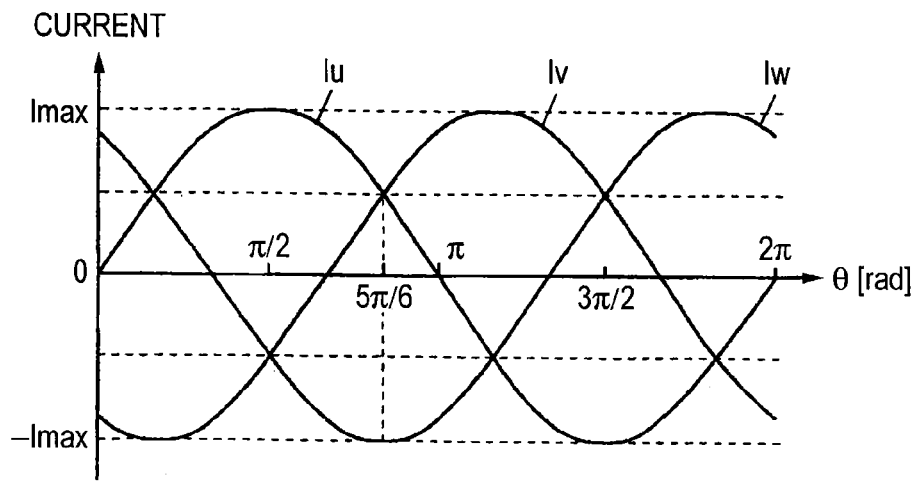
FIG. 6 is a waveform diagram illustrating a three-phase current in the electric power steering apparatus having the brushless motor.

The second restrict value calculating unit 50 includes square integrating units 51u, 51v, 51w, a maximum selecting unit 52, and a second restrict value table 53 as shown in FIG. 5. The square integrating unit 51u integrates the squares of the u-phase current detection value Iu for a predetermined time, the square integrating unit 51v integrates the squares of the v-phase current detection value Iv for a predetermined time, and the square integrating unit 51w integrates the squares of the w-phase current detection value for a predetermined time. The maximum selecting unit 52 selects and outputs a maximum value of the three integration value acquired in the square integrating units 51u, 51v, and 51w. The second restrict value table 53 stores the restrict value of the q-axis current to be supplied to the brushless motor 1 corresponding to the integration value of the squares of the one-phase current.

In the brushless motor 1 and the peripheral circuit of the brushless motor 1, an amount of heat of the each phase can be estimated on the basis of the output of the square integrating units 51u, 51v, 52w (that is, the integration value of $Iu^2$, the integration value of $Iv^2$, the integration value of $Iw^2$). Accordingly, the maximum value of heat of the each phase can be estimated on the basis of the output of the maximum selecting unit 52. Accordingly, in the second restrict value table 53, the restrict value of the q-axis current of the estimated each amount of heat is stored corresponding to the integration value of the squares of the one-phase current. By using the output of the maximum selecting unit 52, the second restrict value Im2 in the second restrict value calculating unit 50 is determined with reference to the second restrict value table 53.

In addition, the first restrict value calculating unit 40, as a substitution for the first limitation value table 43, may include a first restrict value operating unit obtaining the restrict value of the q-axis current on the basis of the integration value of the square sum of the d-axis current and the q-axis current by an arithmetic operation. The second restrict value 50 may include, as a substitution for the second limitation value table 53, a second restrict value operating unit obtaining the restrict value of the q-axis current on the basis of the integration value of the square of the one-phase.

In the current value limiter 30, the first restrict value Im1, the second restrict value Im2 determined by the aforementioned manner are used as restriction values for limiting the target current value It so as not to be greater than predetermined value. By restricting the target current value It so as to not be greater than the first restrict value Im1 which is on the basis of the integration value of the squares of the d-axis current and the q-axis current, the motor driving current can be restricted so that a total amount of heat is not greater than a predetermined value. In addition, by restricting the target current value It is not greater than the second restrict value Im2 which is on the basis of the maximum value of the integration value of the squares of the three-phase current, the motor driving current can be restricted so that the amount of heat of the each phase is not greater than a predetermined value.

In the above-mentioned electric power steering apparatus according to the embodiment, by using the first restrict value Im1 which is on the basis of the square sum of the d-axis current and the q-axis current, the motor driving current is restricted in accordance with the total amount of heat and the motor driving current is restricted in accordance with the amount of heat of the each phase by using the second restrict value Im2 which is on the basis of the squares of the three-phase current. By using the two restrict values so as to restrict the motor driving current, it is possible to restrict properly the motor driving current in accordance with a general driving condition and various steering conditions such as maintaining steering, a fast steering. Accordingly, it is possible to protect the device from emitting the heat in the various steering conditions.

In addition, as mentioned-above, the first restrict value Im1 is determined on the basis of the integration value of ($Id^2+Iq^2$) and the second restrict value Im2 is determined on the basis of the maximum value of integration value of $Iu^2$, the integration value of $Iv^2$, and the integration value of $Iw^2$. The first restrict value Im1 may be determined on the basis of the average value of ($Id^2+Iq^2$) or the second restrict value Im2 may be determined on the basis of the maximum value of the average value of $IU^2$, the average value of $Iu^2$ and the average value of $Iw^2$.

In addition, the invention applies in an electric power steering apparatus of a column assist type, an electric power steering apparatus of a pinion assist type, and an electric power steering apparatus of a rack assist type.

The embodiments described above are to be regard as illustrative rather than restrictive, Variations and changes may be made by others, and equivalents employed, without departing from spirit of the present invention. Accordingly, it is intended that all variation, changes and equivalents which fall within the spirit and scope of the present invention as defined in the claims be embraced thereby.

What is claimed is:

1. An electric power steering apparatus capable of restricting a motor driving current, the apparatus comprising;
    a brushless motor that generates assistant steering force to be supplied to a steering mechanism of an automotive vehicle;
    a controller that acquires a level of three-phase voltage used for driving the brushless motor;
    a motor driver that drives the brushless motor based on the level of the three-phase voltage acquired by the controller; and
    a current detector that detects a level of three-phase current flowing in the brushless motor,
    wherein the controller includes:
        a current value converter that converts the level of the three-phase current into a d-axis current detection value and a q-axis current detection value,
        a target current calculator that calculates a target value of a current supplied to the brushless motor on the basis of an input value including at least a steering torque,
        a current value restrictor that restricts the target value calculated by the target current calculator so as not to be greater not only than a first restrict value based on a square sum of the d-axis current detection value and the q-axis current detection value but also than a second restrict value based on the squares of the level of the three-phase current, and
        a voltage value determining unit that determines a level of three-phase voltages on the basis of target value restricted by the current value restrictor, the d-axis current detection value, and the q-axis current detection value.

2. The electric power steering apparatus according to claim 1, wherein the first restrict value is determined on the basis of an integration value of the square sum of the d-axis current detection value and the q-axis current detection value.

3. The electric power steering apparatus according to claim 1, wherein the second restrict value is determined on the basis of a maximum value of an integration value of the squares of the level of a u-phase current detected by the current detector, an integration value of the squares of the level of a v-phase current detected by the current detector, and an integration value of the squares of the level of a w-phase current detected by the current detector.

* * * * *